United States Patent [19]

Fischer

[11] 4,372,401
[45] Feb. 8, 1983

[54] DRILL TOOL

[76] Inventor: Artur Fischer, Weinhalde 34, D-7244 Tumlingen/Waldachtal, Fed. Rep. of Germany

[21] Appl. No.: 280,514

[22] Filed: Jul. 6, 1981

[30] Foreign Application Priority Data

Jul. 19, 1980 [DE] Fed. Rep. of Germany ....... 3027408

[51] Int. Cl.³ .............................................. E21C 7/00
[52] U.S. Cl. .................................... 175/209; 175/211; 175/408
[58] Field of Search ............... 175/209, 210, 211, 263, 175/292, 408, 220; 411/29, 30, 31; 408/202

[56] References Cited

U.S. PATENT DOCUMENTS

| 1,373,996 | 4/1921 | Clore | 175/421 |
| 1,774,884 | 9/1930 | Hansen | 175/209 X |
| 1,983,488 | 12/1934 | Pedigo | 175/408 X |
| 3,536,149 | 10/1970 | Laird | 175/209 |
| 4,010,807 | 3/1977 | Fischer | 175/408 X |
| 4,111,270 | 9/1978 | Fischer et al. | 175/220 |
| 4,209,069 | 6/1980 | Smith | 175/209 |
| 4,223,748 | 9/1980 | Barendsen | 175/209 |

FOREIGN PATENT DOCUMENTS 2657000 6/1978 Fed. Rep. of Germany ...... 408/202

Primary Examiner—Stephen J. Novosad
Assistant Examiner—Joseph Falk
Attorney, Agent, or Firm—Michael J. Striker

[57] ABSTRACT

A tool for drilling a cylindrical hole with an enlarged end undercut portion comprises a shank with cutting edges and a drill collet screwed to the shank by a knuckle thread. The collet is provided with a stop collar having a semispherically-shaped face supported in a matingly configurated recess provided in a stop plate so as to form a swivel bearing. A portion of the collet is closed by a bell connected to the stop plate and formed with a central hole to receive the shank of the tool.

10 Claims, 1 Drawing Figure

U.S. Patent  Feb. 8, 1983  4,372,401
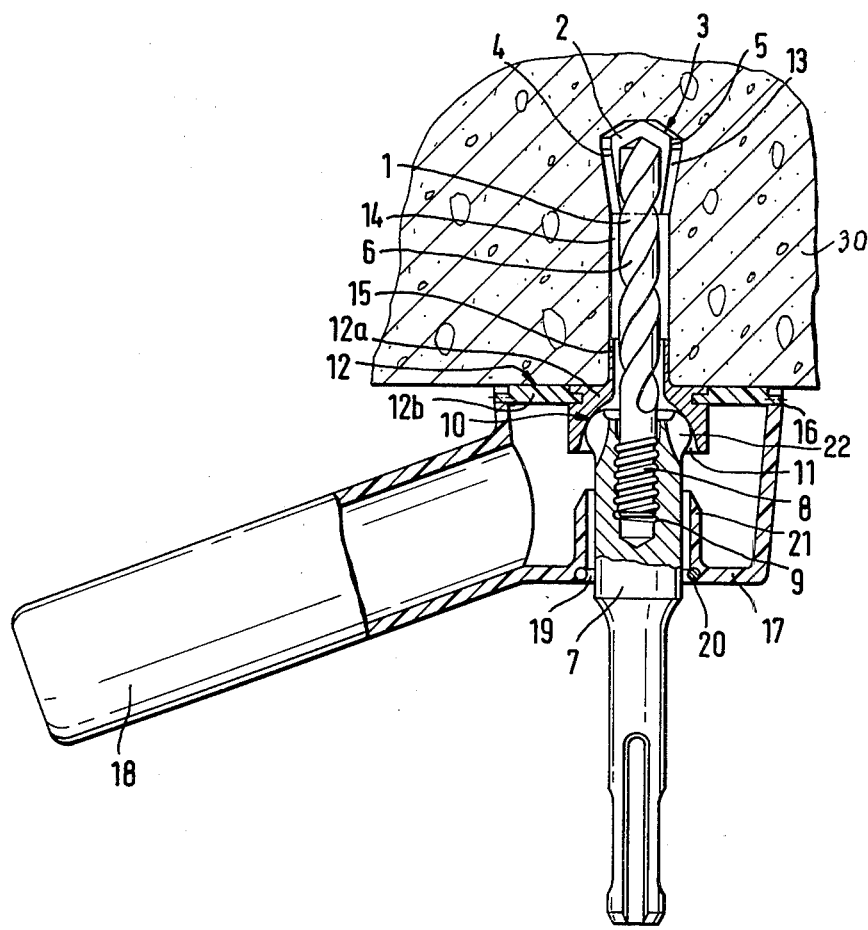

DRILL TOOL

BACKGROUND OF THE INVENTION

The present invention relates to a drilling tool, and particularly to a drilling tool which is clamped in a chuck of a drilling machine. More particularly, the invention relates a drilling tool for forming holes in a support structure for insertion and anchoring therein fastening elements having end spreading portions.

Drills are known which include a shank which is connected to a drilling machine and adapted to be driven into rotation about its axis to form a hole in a support structure, and a drill bit at one end of the drill shank and having cutting edges projecting substantially radially of the axis and beyond the drill shank, the drill bit being adapted for increasing the cross-sectional area of the hole so as to provide in the area of the hole beyond the drill shank an undercut. For forming such an undercut, the drill is subjected to swiveling or rocking movement when the drill is advanced to the desired hole depth.

The conventional drilling tools of the type under consideration are provided with a stop plate which engages the surface of the support structure and receives contact pressure occuring during the drill and swivelling operations.

It is a well-known practice to displace a stop sleeve of the stop plate along the drill shank and to fix the sleeve on the drill shank in a predetermined position, for example by a stud bolt in order to adapt the drill for drilling holes of different depth. The stud bolt connecting the stop sleeve to the shank is normally inserted into the wall of the stop sleeve. However, such manner of fixing of the stop sleeve on the shank has been found suitable only for use in soft building materials where no percussion drilling machines are required. For drilling holes with undercut portions in concrete, or cement, or masonry percussion drills are utilized. The problem with these otherwise satisfactory installations in which the stop sleeve is fixed on the drill shank by means of a stud bolt or similar fixing means, is that since the stop sleeve is subjected to displacements, the stud bolt is breaking loose or being sheared off due to the percussion effect.

Also in the known designs the drill shank is directly clamped in the drill chuck of the drilling machine. The relatively long drill shank clamped, for example in a jaw chuck of the drilling machine, when used in hammer or percussion drills, is in addition provided with adapters for the drill chuck of the hammer drill. The utilization of special adapters as well as means for fixing the stop sleeve on the drill shank make the cost of the drill rather high. It is also known that drill shanks being a wear part of the drilling tool should be frequently replaced. All of this indicates that drilling of holes having undercut portions with an increased cross-section by the conventional drilling tools is rather expensive.

SUMMARY OF THE INVENTION

It is an object of the present invention to overcome the aforementioned disadvantages of the prior art.

More particularly, it is an object of the present invention to provide an improved drilling tool of the type under discussion.

It is a further object of the invention to provide such an improved drilling tool which permits simple and quick adjustment of the drilling tool to varying drill hole depths of the holes to be produced in a support structure.

These and other objects of the invention are attained by a tool for drilling undercut holes in a support structure, comprising an elongated drill shaft having an axis of rotation, a drill bit at one end of said drill shaft and having cutting edges extended radially outwardly of said drill shaft, a drill collet at the other end of said drill shaft, said drill collet being provided with a stop collar being of a substantially semispherical configuration, a stop plate being formed with a recess supporting said stop collar and being shaped so as to matingly complement the configuration of said stop collar thus forming therewith a swivel bearing, said drill shank being screwed into said drill collet; and a drill bell connectable to said stop plate and having a central through bore to receive said drill collet, said cutting edges being operative for forming a cylindrical hole in said support structure when the tool is axially advanced within said structure and for forming an enlarged undercut portion of the hole when a swiveling movement is imparted to the tool.

The central through bore in the drill bell may have such a diameter that it limits an angle of swiveling movement of the drill collet, this angle being adapted to a desired degree in accordance with an enlarged undercut portion of the hole to be produced.

The shank and collet may have respective external and internal knuckle threads.

The recess in the stop plate may have a portion projecting beyond the stop collar in a direction of the drill bit so as to receive the drill shank therein.

The stop collar may be provided with a number of recesses extending in an axial direction.

The top plate may include a sleeve-shaped centering projection extending into the hole being produced and having an internal diameter larger than the external diameter of the drill shank, said shank extending through said sleeve-shaped projection.

The stop plate may include a disc connected to the bell, and a bushing mounted in said disc and formed with said recess supporting said stop collar, said projection being formed on said bushing.

The disc may be made of plastic and the bushing may be made of metal.

The tool may be provided with a pipe socket connected to the bell and serving as a handle.

The bell may be formed with a sleeve-shaped projection extended inwardly of the bell and formed with the central through bore to receive the drill collet.

The drill tool according to the invention allows for a favorable direction of forces from the percussion drilling machine to the drill bit. The stop plate can not be displaced and therefore the depth of the set drill hole cannot change inadvertently. The varying drill hole depths, however can be easily set by screwing drill shanks of different length into the drill collet. It will be understood that the drill shank which is a wear part of the tool can be easily changed.

A knuckle thread utilized for the shank and the collet connected thereto is particularly suitable in the design under discussion since almost no notch effect arises during operation and the percussion forces are transmitted from the drilling machine to the drill bit only in the axial direction.

The provision of the stop plate with a recess having a portion extending beyond the stop collar prevents the collar from slipping and thus effects central guidance of the shank during the swivelling and rocking movement.

The centering projection formed on the stop plate and extending into a hole being produced aids in centering of the drill tool. Due to this centering projection the uniform scraping out during forming of the undercut portion of the hole is possible.

By forming a bushing of the stop plate of metal and mounting the same in a plastic disc, the excessive wear occuring due to high degree of friction caused by rotary motion of the stop collar in the complementary recess is substantially prevented. The part of the stop plate which is less subjected to wear is made of plastic for reasons of economy. The stop plate may be formed in an injection molding process.

The pipe socket secured to the bell can be connected to an exhaust device for discharge of the fine drillings. Using the pipe socket as a handle facilitates handling of the drill tool.

As was mentioned above the through bore may be formed in a sleeve-shaped projection of the bell. This projection extends inwardly of the bell and has an inner diameter larger than the diameter of the drill collect in order to allow for swiveling movement of the tool and to prevent the flow of cuttings through a gap between the bell and the collet even when holes are drilled into ceilings.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawing.

BRIEF DESCRIPTION OF THE DRAWING

The sole FIGURE illustrates an axial sectional view of the drill tool according to the invention.

DETAILED DESCRIPTION OF THE INVENTION

Referring now to the drawing, it will be seen that the drill comprises a shank 1 and a front end portion or a drill bit 2 connected to the free end of the drill shaft and having lateral cutting edges 4 and 5 projecting radially outwardly from the drill shank. Grooves 6 helically arranged on the drill shank 1 serve for discharging cuttings from a hole 14 being produced. The end portion of the drill shank 1 is received in a collet 7. For connection of the drill shank to the collet 7 the rear end portion of the shank is provided with an external knuckle thread 8 which matches an internal thread 9 formed in the drill collet 7. The depth of the hole to be made in a support structure denoted as 30 is determined by the length of drilling. Varying of the drill hole depth can be easily set by screwing drill shanks of different lengths into the drill collet. Since the drill shank which is a wear part of the tool has to be frequently replaced, the drill holes of differing depths can be produced at low cost due to the screw connection between the drill shank and the drill collet.

The front face of the drill collet 7 is provided with a stop collar 10 having a semispherically-shaped configuration. The stop collar 10 is formed with recesses 22 extending in the axial direction. These recesses aid in discharging the fine drillings out of the hole being produced. The drilling tool assembly further includes a stop plate 12 engaging with the brickwork surface of the support structure 30 during swivelling operation. A sleeve or bushing 12a is mounted in a bore formed in the stop plate 12. The sleeve 12a is formed with an axially extended recess 11 shaped to support the stop collar 10. By positioning of the semispherically-shaped collar 10 within the matchingly shaped portion of the recess 11 a swivel bearing is obtained which allows swivelling of the drill during drilling of a cylindrical portion of hole 14 and rocking movement of the drill during drilling for increasing the cross-sectional area of the hole to produce an enlarged undercut portion thereof. The sleeve 12a may be made of metal and embedded in a plastic disc 12b forming the stop plate 12. It is to be understood that the stop plate 12 may be made as one-piece element provided with the recess 11 supporting the collar 10. As seen in the drawing the recess 11 extends over the semispherical area of the stop collar 10 to receive the drill shank 1. The sleeve 12a is provided with a sleeve-shaped centering projection 15, which extends into the drill hole 14 for centering the shank and holding the latter within the hole 14.

The stop plate 12 is connected to a drill bell 17 adapted to collect the cuttings and facilitate handling of the drilling tool. The connection between the bell 17 and stop plate 12 may be provided by means of twist connection 16, or pin connection, or screw connection, or by any other suitable means. The bell 17 is formed with a pipe socket 18 laterally attached to the bell and designed as a handle. The pipe socket 18 can be formed integrally with the bell 17 as shown in the drawing or as a separate element connected to the bell by any conventional means. The pipe socket 18 can be connected to a hose of an exhaust device (not shown).

The bell 17 has a through bore 19 the diameter of which is chosen in accordance with desired degree of swivelling movement during drilling of the enlarged portion of the hole 14 due to limiting the swivelling movement of the drill unit. To reduce friction between the bell 17 and the collect 7 a metal ring 20 is embedded in the drill bell in the area of bore 19 against which the collet 7 can strike. A sleeve-shaped projection 21 extended inwardly of the bell 17 is formed on the bell to prevent fine drillings or cuttings produced during the drilling operation, from discharging through a gap between the through bore 19 and drill collet 7.

In operation, the cylindrical portion of the hole 14 is first produced by advancing the tool into the support structure to a sufficient or desired depth; then a rocking or a swivelling motion is imparted to the tool while the latter is driven into rotation about its axis. In this manner the bottom portion of the hole is enlarged by forming an undercut portion therein. Because of the semispherical shape of the collar 10 supported in the recess 11 the drilling tool may be easily tilted during the swivelling movement.

It will be understood that each of the elements described above, or two or more together, may also find a useful application in other types of drill tools differing from the types described above.

While the invention has been illustrated and described as embodied in a drill tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool for drilling holes with undercut enlarged portions in a support structure, comprising an enlongated drill shank having an axis of rotation, a drill bit at one end of said drill shank and having cutting edges extended radially outwardly of said drill shank; a drill collet at the other end of said drill shank, said drill collet being provided with a stop collar being of a substantially semispherical configuration; a stop plate being formed with a recess supporting said stop collar and being shaped so as to matingly complement the configuration of said stop collar thus forming therewith a swivel bearing; said drill shank being screwed into said drill collet; and a drill bell connectable to said stop plate and having a central through bore to receive said drill collet, said cutting edges being operative for forming a cylindrical hole in said support structure when the tool is axially advanced within said structure and for forming an enlarged undercut portion of the hole when a swiveling movement is imparted to the tool.

2. The tool as defined in claim 1, wherein said central through bore of said drill bell has such a diameter that it limits an angle of swiveling movement of said drill collet, this angle being adapted to a desired degree in accordance with an enlarged undercut portion of the hole to be produced.

3. The tool as defined in claim 2, wherein said drill shank and said drill collet have respective external and internal knuckle threads.

4. The tool as defined in claim 3, wherein said recess has a portion projecting beyond said stop collar in a direction of said drill bit so as to receive said drill shank therein.

5. The tool as defined in claim 4, wherein said stop collar is provided with a number of recesses extending in an axial direction.

6. The tool as defined in claim 5, wherein said stop plate includes a sleeve-shaped centering projection extending into the hole being produced and having an internal diameter larger than the external diameter of said drill shank, said shank extending through said sleeve-shaped projection.

7. The tool as defined in claim 6, wherein said stop plate includes a disc connected to said bell, and a bushing mounted in said disc and formed with said recess supporting said stop collar, said projection being formed on said bushing.

8. The tool as defined in claim 7, wherein said disc is made of plastic and said bushing is made of metal.

9. The tool as defined in claim 6, further including a pipe socket connected to said bell to receive cuttings therefrom, said pipe socket being a handle.

10. The tool as defined in claim 9, wherein said bell is formed with a sleeve-shaped projection extended inwardly of said bell and provided with said central through bore.

* * * * *